United States Patent [19]
Smith

[11] 3,766,491
[45] Oct. 16, 1973

[54] RADIATION AND PRESSURE BROADENING TECHNIQUE FOR SINGLE FREQUENCY GAS LASERS

[75] Inventor: Peter William Smith, Colts Neck, N.J.

[73] Assignee: Bell Telephone Laboratories, Incorporated, Murray Hill, Berkeley Heights, N.J.

[22] Filed: Apr. 21, 1972

[21] Appl. No.: 246,160

[52] U.S. Cl. ................................ 331/94.5, 330/4.3
[51] Int. Cl. ............................................. H01s 3/22
[58] Field of Search...................... 331/94.5; 330/4.3

[56] References Cited
UNITED STATES PATENTS
3,386,043  5/1968  Marcatili et al. .................. 331/94.5
3,404,349  10/1968  Rigrod ............................. 331/94.5

OTHER PUBLICATIONS
Smith, A Waveguide Laser. Appl. Phys. Let. Vol. 19, No. 5 (Sept. 1, 1971) pp. 132-134.

*Primary Examiner*—William L. Sikes
*Attorney*—W. L. Keefauver

[57] ABSTRACT

Single frequency operation is achieved in a gas laser by mutually adapting the total gas pressure and the radiation density so that twice the radiation-broadened homogeneous linewidth is greater than the inhomogeneous linewidth. Such lasers typically employ high pressures (e.g., 8–10 Torr in He-Ne) and narrow bore waveguide tubes (e.g., 0.4 mm). Other configurations for increasing radiation density described include the use of relatively larger diameter gas tubes in various types of confocal resonators, and/or a plurality of such gas tubes disposed along a zig-zag path within a free space resonator.

14 Claims, 15 Drawing Figures

HOMOGENEOUS

INHOMOGENEOUS

LONGITUDINAL RESONATOR MODES

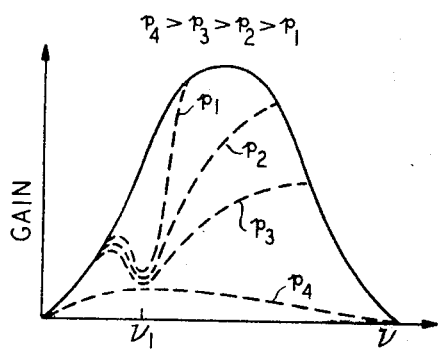
FIG. 4
p = TOTAL PRESSURE
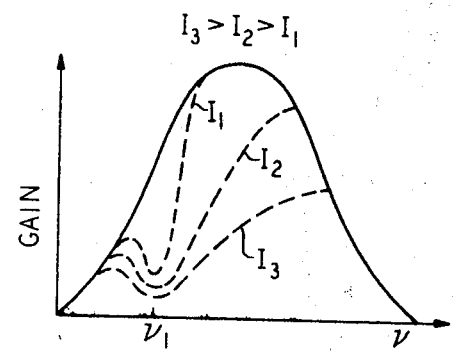
FIG. 5
I = RADIATION DENSITY
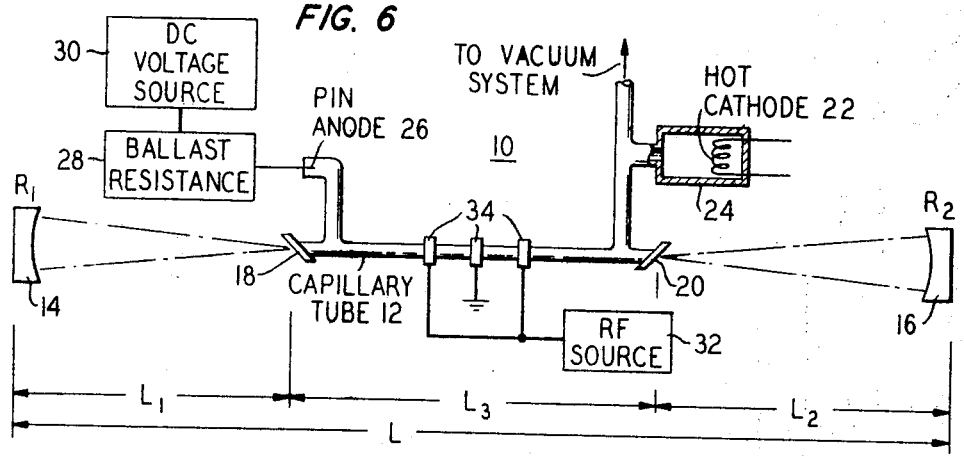
FIG. 6
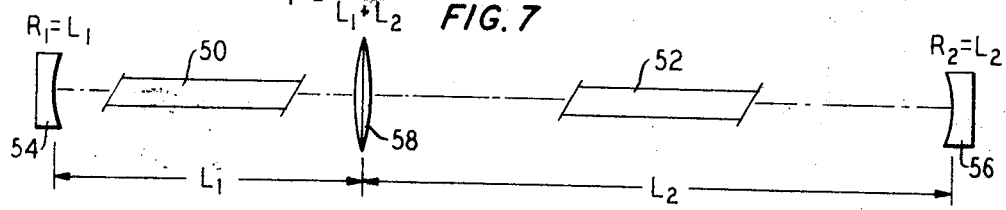
$$f = \frac{L_1 L_2}{L_1 + L_2}$$ FIG. 7
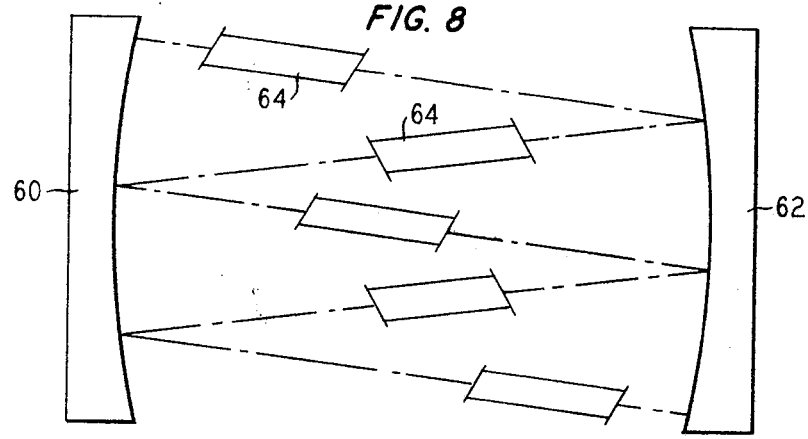
FIG. 8

RADIATION AND PRESSURE BROADENING TECHNIQUE FOR SINGLE FREQUENCY GAS LASERS

BACKGROUND OF THE INVENTION

This invention relates to single frequency operation of gas lasers.

Because the resonators which are used for typical lasers have dimensions which are large compared to an optical wavelength, they will, in general, have a large number of closely spaced axial, i.e., longitudinal, modes. If the active medium placed in such a resonator exhibits gain at several of the mode frequencies, it might be expected that the laser output would consist of light at a number of closely-spaced frequencies. Although Schawlow and Townes, in their classic paper (*Physical Review*, Vol. 112, pp. 1940–1949 (1950)) proposing laser operation had suggested that for a sufficiently stable laser, gain nonlinearities might cause mode suppression which would result in single-mode oscillation, early lasers were found to oscillate in a band of discrete frequencies with a bandwidth typically $10^{-4} - 10^{-5}$ of the laser frequency. Although this is a rather monochromatic light source, there are still many applications for which greater spectral purity is desirable, to wit, where the laser is to be used (1) as a carrier source in an optical communications system, (2) for making holograms with appreciable depth of field, (3) as a pump for parametric oscillators, (4) as a standard of time with suitable frequency stabilization, (5) in light scattering experiments, especially Brillouin studies, and (6) in tunable laser spectroscopy.

Consequently, a number of mode-selection techniques have been proposed to enable one to construct single-frequency laser oscillators. It should be noted that each of the transverse modes of a laser also oscillates at a different resonant frequency. Thus, in order to construct a single-frequency laser it is necessary in general to provide for not only longitudinal but also transverse mode selection. Exemplary of prior art proposals to achieve single-frequency operation are the following: (1) a complex laser resonator proposed by Kleinman and Kisluik (*Bell System Technical Journal*, Vol. 41, pp. 453–462 (1962)) and demonstrated by Kogelnik and Patel in a He-Ne laser (*Proc. IRE (Correspondence)*, Vol. 50, pp. 2365–2366 (1962)); (2) an interferometric mode selector in a ruby laser by Collins and White (*Applied Optics*, Vol. 2, pp. 448–449 (1963)); (3) a traveling wave scheme in ruby by Tang et al. (*Journal of Applied Physics*, Vol. 34, pp. 2289–2295 (1963)); (4) short resonators in He-Ne lasers reported by several authors around 1964, e.g., Gordon and White (*Proc. IEEE (Correspondence)*, Vol. 52, pp. 206–207 (1964)); (5) a Q-switched ruby laser with a multiple reflector as an end mirror by Hercher (*Applied Physics Letters*, Vol. 7, pp. 39–41 (1965)); (6) demodulation of the output of an FM mode-locked He-Ne laser to obtain a single frequency output by Massey et al. (*Applied Physics Letters*, Vol. 6, pp. 10–11 (1965)); (7) a novel interferometric laser resonator by Fox in U.S. Pat. No. 3,504,299 issued on Mar. 31, 1970; (8) saturable dyes in Q-switched lasers by Sooy (*Applied Physics Letters*, Vol. 7, pp. 36–37 (1965)); (9) a resonant absorber inside a laser resonator by Chebotayev et al. (*IEEE Journal of Quantum Electronics*, Vol. QE-4, pp. 788–790 (1968)) and independently by Lee (*Applied Physics Letters*, Vol. 13, pp. 373–375 (1968)); and (10) a metal film inserted at a nodal plane in a laser resonator by Troitskii et al. (*Journal of Experimental and Theoretical Physics Letters*, Vol. 7, pp. 36–38 (1968)).

In the field of transverse mode selection, Li proposed the use of an aperture in the laser resonator (*Bell System Technical Journal*, Vol. 42, pp. 2609–2620 (1963)), Li and Smith described the use of a "cats-eye" resonator to obtain high power, fundamental transverse mode operation in a He-Ne laser operating at 6328 angstroms (*Proc. IEEE*, Vol. 53, p. 299 (1965)), Siegman proposed the use of unstable resonators (*Proc. IEEE*, Vol. 53, pp. 277–287 (1965)) and Johnston et al described low-level signal injection to select the transverse modes of a laser resonator in U. S. Pat. No. 3,576,502 issued on Apr. 27, 1971.

From the foregoing synopsis it is at once apparent that there has been a long felt interest in a single-frequency laser. However, the numerous and varied approaches taken in attempts to satisfy this interest indicate that no one solution has been completely satisfactory. In particular, one problem with most of the techniques is that additional equipment which was required (e.g., metal films, interferometric resonators) rendered the laser design undesirably complex with attendant high cost and larger bulk.

SUMMARY OF THE INVENTION

I have found, however, that single frequency operation is achieved in a gas laser by mutually adapting the total gas pressure and the intracavity radiation density so that the radiation-broadened homogeneous linewidth $(2\gamma'_h)$ is greater than the inhomogeneous linewidth $(\Delta\nu_D)$, i.e., the full width at half maximum of the Doppler broadened gain curve. As described more fully hereinafter, the maximum allowable prssure is utilized consistent with mechanical stress limits and with the desired gain (which decreases as the pressure is increased above the optimum for a given tube size). In addition, the power density of the radiation in the resonator is increased until $2\gamma'_h \geq \Delta\nu_D$ which insures that only one longitudinal mode experiences appreciable net gain. Increased radiation density can be achieved by means of a narrow bore capillary waveguide discharge tube, or by means of a relatively larger diameter tube in combination with a confocal or a modified confocal resonator. Alternatively, a plurality of such gas tubes disposed along a zig-zag path in a free space resonator may be used.

BRIEF DESCRIPTION OF THE DRAWING

The structural configurations and operation of my invention, together with its various features and advantages, can be easily understood from the following more detailed description taken in conjunction with the accompanying drawing in which:

FIGS. 4 and 5 show how gain saturation changes with gas pressure ($p$) and radiation density (I), respectively;

FIG. 6 is an illustrative embodiment of my invention utilizing a narrow bore tube and high total pressures;

FIG. 7 is a schematic of a second emboidment of my invention utilizing modified confocal resonator; and FIG. 8 is a schematic of a third embodiment of my invention.

DETAILED DESCRIPTION

Before discussing my invention in detail, it will be helpful to consider first the roles which gain saturation and mode competition play in longitudinal mode selection.

Figure 1A:
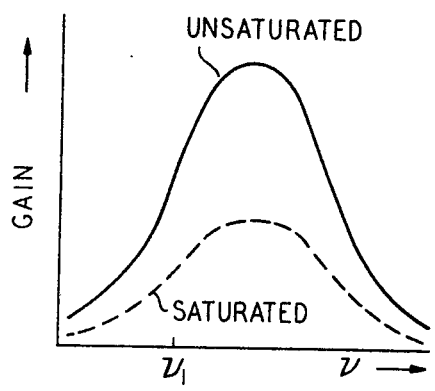
FIGS. 1A and 1B show the saturation behavior of homogeneously and inhomogeneously broadened resonance lines, respectively, under the influence of intense monochromatic radiation at a frequency equal to $\nu_1$.
Figure 1B:
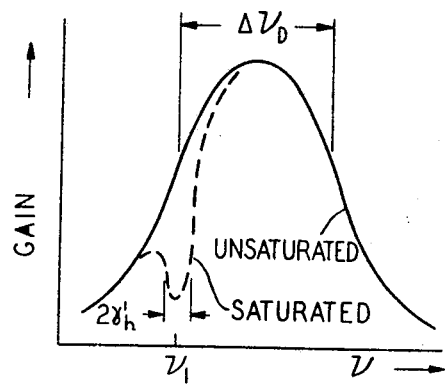

Gain saturation in a laser active medium can occur either homogeneously or inhomogeneously. A homogeneously broadened resonance line is one within which all the atoms of the active medium respond in the same way to incoming monochromatic radiation. Within an inhomogeneously broadened resonance line, however, different groups of atoms have different frequency responses and thus only those atoms within groups which have a frequency response close to the frequency of the incoming radiation will interact appreciably with it. These remarks may be made clearer by reference to FIGS. 1A and 1B which show the saturation behavior of a homogeneous and an inhomogeneous resonance line, respectively, under the influence of monochromatic radiation at a frequency equal to $\nu_1$. For an inhomogeneous line it is possible to "burn a hole," i.e., saturate only those atoms with resonant frequencies close to that of the incident radiation.

Figure 2A:
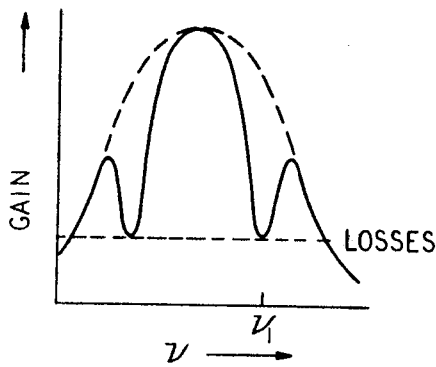
FIG. 2A is a plot of laser gain as a function of frequency for a single longitudinal mode at a frequency $\nu_1$ away from the atomic line center.

Although a detailed treatment of the theory of laser operation is rather complicated, a physical understanding can be obtained from a "hole-burning" model due to W. R. Bennett, Jr., (*Physical Review*, Vol. 126, pp. 580–593 (1962)). In a typical laser with a simple two-mirror resonator, the radiation in the resonator consists of approximately equal intensities of light travelling in each direction, and standing waves are formed in the resonator. If, for example, the laser medium is a gas whose gain curve is inhomogeneously broadened because of the Doppler effect (due to the distribution of thermal velocities), then a single frequency of radiation in the resonator will, in general, interact with two groups of atoms — one group in resonance with the light travelling one direction, and the other group with light travelling in the opposite direction. FIG. 2 illustrates this phenomenon for the case of a steady-state laser oscillator in which the gain is saturated to equal the losses. The width of the "hole" "burned" in the gain curve by incident radiation of intensity I and of frequency $\nu_1$ can be shown to be $$2\gamma'_h = 2\gamma' (1+I/I_s)^{1/2} \tag{1}$$

where $\gamma'_h$ is the half width at half maximum of the hole burned in the gain curve, $2\gamma'$ is the homogeneous linewidth at low radiation intensity, and $I_s$ is a group of atomic constants which is a measure of the intensity required for a given degree of saturation. It can be seen from Equation (1) that the width of the hole in the inhomogeneously broadened gain curve is just $2\gamma'$ — the homogeneous linewidth — at low power levels, and increases slowly with increasing saturating intensity. Note that as the frequency of oscillation ($\nu_1$) is tuned to atomic line center, both the forward- and backward-travelling waves interact with the same group of atoms. Thus, at line center fewer atoms contribute to the laser output and the power is reduced. This effect is evident in FIG. 2C which shows the so-called "Lamb dip" at the center of the output power vs. frequency curve. The width of the Lamb dip at low laser powers gives a measure of the homogeneous linewidth, $2\gamma'$.

Figure 3A:
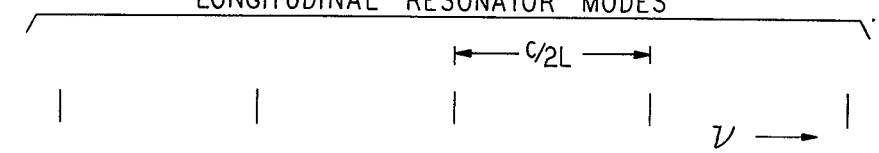
FIG. 3A shows the $c/2L$ spacing of the longitudinal modes of a Fabry-Perot resonator of length L.
Figure 3B:
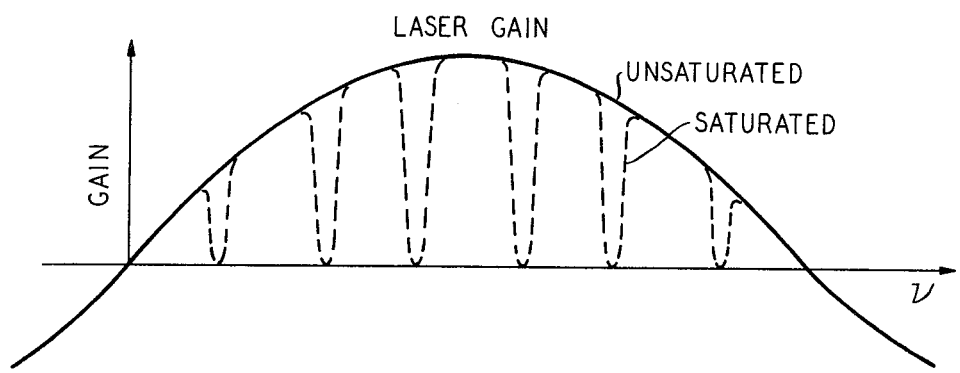
FIGS. 3B and 3C show respectively the laser gain and output frequency spectrum for $2\gamma'_h \ll \Delta\nu_D$.
Figure 3C:
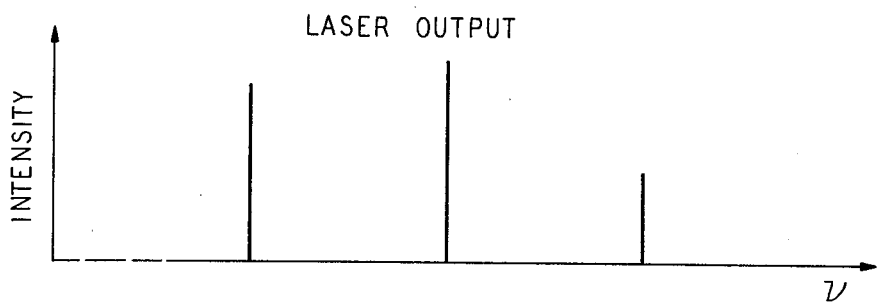
Figure 3D:
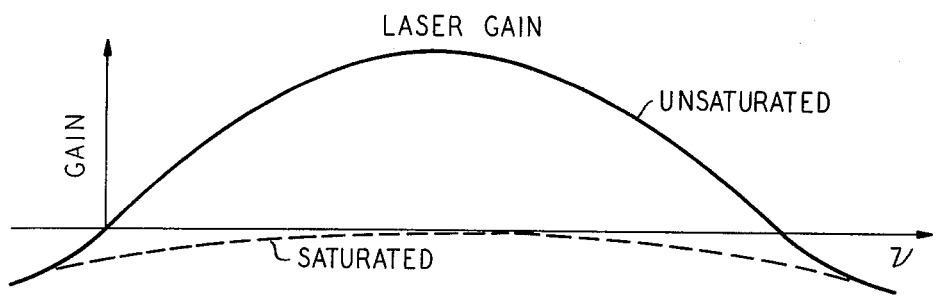
FIGS. 3D–3E show respectively laser gain saturation and output frequency spectrum for $2\gamma' \geq \Delta\nu_D$ ($\gamma'$ is $\gamma'_h$ in the absence of radiation broadening)
Figure 3E:
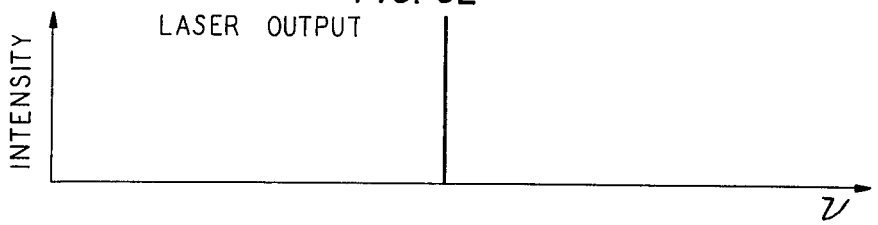

From the previous discussion we have seen that radiation in a single resonator mode can interact with atoms over a total frequency range of the order of $2\gamma'_h$. If $\gamma'_h$ is much smaller than the gain bandwidth, then radiation will build up at other modes which occur at regions where the gain is not saturated, as illustrated in FIG. 3. In FIGS. 3B and 3C the gain saturation and laser output, respectively, are shown for the case $2\gamma'_h \ll \Delta\nu_D$. Illustratively, three modes are above threshold for oscillation, and the laser output consists of radiation in these modes. In FIGS. 3D and 3E, the case is $2\gamma' \geq \Delta\nu_D$, i.e., an essentially homogeneously broadened line. In this case, although three modes were initially above threshold, radiation in the mode closest to line center has saturated the gain so that the other two modes are below threshold for oscillation. Consequently, one would expect the laser output to consist of single-frequency radiation at the frequency of the mode closest to line center.

Techniques for achieving single frequency operation can be classified in two categories: (1) coarse frequency selection schemes in which laser oscillation is confined to a single atomic or molecular line, but which usually do not have sufficient selectivity to confine laser action to a single resonator mode. These schemes include the use of multilayer dielectric mirrors, intracavity prisms, a diffraction grating as an end mirror, intracavity absorption gas cells and Lyot filters. To achieve single mode operation these schemes are usually combined with an intracavity interferometric arrangement in which some type of complex laser resonator using more than two mirrors is used to provide a resonant structure for which only one high Q (low loss) resonator mode will be above threshold for laser oscillation. These schemes have the drawback that the maximum output power that may be obtained in a single frequency is limited by the fact that a single frequency of radiation will not in general interact with all of the atoms in an inhomogeneously — broadened resonance line. Another problem with interferometric mode selectors is that they depend on the precise tuning (within a small fraction of a wavelength) of two or more coupled optical resonators. Drift problems thereof necessitate the use of some form of feedback system to stabilize the output frequency. Thus, these interferometric schemes are potentially less efficient than some noninterferometric schemes. In practice, however, the power outputs that have been achieved experimentally with the best interferometric and noninterferometric schemes are quite comparable.

I have discovered, however, that single frequency operation in gas lasers at a single longitudinal mode is readily attainable without the need for elaborate, cumbersome and expensive apparatus relied on by the prior art. What I have recognized and demonstrated is that a gas laser will operate in a single frequency if the spectral hole burning due to the inhomogeneously broadened resonance line is eliminated. Stated more precisely, single frequency operation of a gas laser results when the total pressure of the gas or gas mixture of the active medium and the radiation density (i.e., the gas tube and resonator design) are mutually adapted so that the following condition is satisfied:

$$2\gamma'_h > \Delta\nu_D \quad (2)$$

where $\gamma'_h$ is the half width at half maximum of the hole burned in the gain curve and $\Delta\nu_D$ is the full width at half maximum of the Doppler-broadened gain bandwidth, i.e., the inhomogeneous linewidth.

Figure 2B:
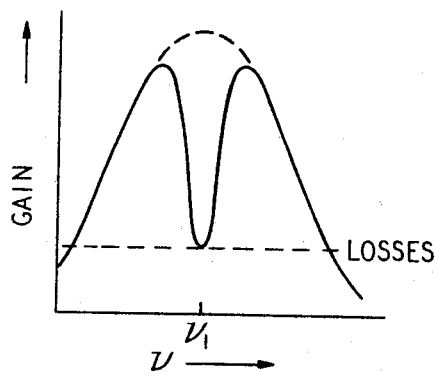
FIG. 2B is similar to FIG. 2A for a single mode at frequency $\nu_1$ at the line center.
Figure 2C:
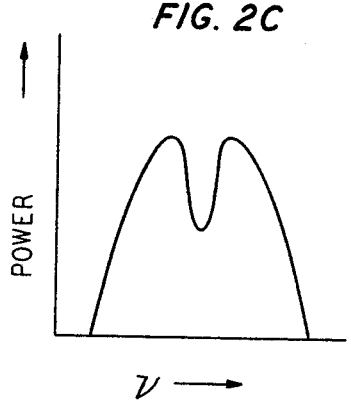
FIG. 2C is a plot of single-mode output power as a function of frequency.

Generally, in a gas laser the hole width $2\gamma'_h$ is less than the inhomogeneous linewidth $\Delta\nu_D$ as shown in FIG. 2B. However, increasing either the total gas pressure or the radiation density, or both, as shown in FIGS. 4 and 5, respectively, increases $2\gamma'_h$. Illustratively, in the design of a gas laser pursuant to my invention, one would first specify the desired gain and then determine the length of the active medium (i.e., the gas tube) and the maximum total pressure, it being well known that gain decreases with decreasing length and increasing total pressure above the optimum pressure for a given tube size. Since the maximum pressure is limited by the gain desired, it is possible that the condition of Equation (2) is not satisfied by the maximum pressure. In this case radiation density must be increased in order to broaden further the homogeneous linewidth $2\gamma'_h$. One way to produce relatively high radiation density and high-pressure operation is to utilize a narrow bore discharge tube. Such a tube takes the form of a capillary waveguide if, for a given tube length $L_3$, the inside diameter $d$ is such that $d < \sqrt{2L_3\lambda}$ where $\lambda$ is the wavelength of the optical radiation. For larger diameter tubes, the simplest way to increase the radiation density is to utilize a confocal resonator which produces a smaller average beam diameter within the resonator than other free-space resonators (e.g., plane parallel, concentric, half-confocal). Alternatively, a modified confocal resonator (FIG. 7) or a zig-zag path resonator (FIG. 8) may be used as described more fully hereinafter.

In an illustrative embodiment of my invention shown in FIG. 6, a gas laser 10 comprises a narrow bore capillary tube 12 disposed along an optic axis extending between a pair of oppositely facing concave mirrors 14 and 16 of radii $R_1$ and $R_2$, respectively. The tube 12, which contains a gaseous active medium or a gas mixture active medium, is provided at each end thereof with well known Brewster angle windows 18 and 20.

Excitation for the gaseous active medium may be either dc or rf or both. The use of both types of excitation is helpful in overcoming relaxation oscillation discharge instability in the narrow-bore dc discharge. Dc excitation is accomplished by means of a conventional hot cathode 22 located in a chamber 24 which communicates with both the capillary tube 12 and a vacuum system (not shown), and by means of a conventional pin anode 26 electrically connected through a ballast resistance 28 to a dc voltage source 30. Rf excitation, on the other hand, is provided by means of an rf source 32, typically a microwave source, the output of which is electrically connected to annular metal rings 34 disposed about, and in intimate contact with, the cylindrical surface of capillary tube 12.

A He-Ne gas laser 10 has been constructed in a capillary waveguide configuration by making the inside tube diameter $d = 430$ μm, the tube length $L_3 = 20$ cm, the mirror radii $R_1 = R_2 = 30$ cm, the separation of the mirrors from the Brewster windows such that $L_1 = R_1 = L_2 = R_2 = 29.5 \pm 0.5$ cm. In this configuration the walls of the tube guide the optical radiation. Thus, it should be noted that the mirrors 14 and 16 do not form a free space resonator. Rather they function to refocus the radiation impinging thereon back into low loss modes of the waveguide tube 12. To this end it is preferable that each mirror be separated from the ends of the tube by a distance approximately equal to the radius of curvature of the mirror, i.e., such that $L_1 \approx R_1$ and $L_2 \approx R_2$. With the gas tube filled with a 10:1 mixture of $He^3:Ne^{20}$ a peak gain at 6328 angstroms of 2.7 dB/m was measured at a total gas pressure of 7 Torr. An output power of 1 mW at 6328 angstroms was obtained with an output mirror having 1 percent transmission. The 3.39 μm gain was so high, however, that no oscillation at 6328 angstroms was obtained unless a methane gas cell (not shown) was placed between one of the mirrors and one end of the tube to suppress the 3.39 μm oscillation. The use of a methane cell is one of the "coarse" frequency selection techniques priorly described but would not be required for other He-Ne lines (e.g., 1.15 μm) or for other gaseous media (e.g., Argon). Thus, the methane cell enabled me to discriminate between different laser lines, i.e., between 3.39 μm and 6328 angstroms, but was ineffective in selecting a single longitudinal mode from a plurality of such modes closely spaced about one line, e.g., 6328 angstroms. In fact, at the 7 Torr pressure mentioned above, and a relatively high excitation level above threshold, the laser oscillated in many modes. Typically 10 modes were spaced over 1000 MHz centered on the 6328 angstrom line. As the total pressure was increased to 10 Torr, however, the homogeneous linewidth was broadened to the point where $2\gamma' = \Delta\nu_D = 1600$ MHz. Since $\gamma'_h$ is always greater than $\gamma'$, inequality (2) was satisfied. Consequently, at pressures of 10 Torr and higher, the foregoing laser oscillated in a single longitudinal mode at 6328 angstroms.

On the other hand, where it is desired to use a tube of shorter length and/or of larger diameter (so that waveguiding by the tube does not take place), then the laser cavity is preferably designed to be a free space confocal resonator. More specifically, in FIG. 6 the mirrors 14 and 16 form a confocal resonator provided that $R_1 = R_2 = L$. Illustratively $L = 100$ cm, $d = 1$ cm and $L_3 = 30$ cm. Further increase in the radiation density may be achieved by utilizing one or more lenses in the resonator to concentrate the light beam to smaller diameters. Thus, as shown in FIG. 7 a pair of discharge tubes 50 and 52 are disposed in a resonator formed by mirrors 54 and 56 and on opposite sides of a focusing lens 58, thereby forming two cavity sections one on either side of the lens 58. To make each of these sections confocal the lens 58 is positioned so that $$f = L_1L_2/L_1+L_2$$

(3)

where $f$ is the focal length of the lens, $L_1$ and $L_2$ are separations between the lens 58 and mirrors 54 and 56, respectively. In addition, it is required that $R_1 = L_1$ and $R_2 = L_2$ where $R_1$ and $R_2$ are the radii of curvature of mirrors 54 and 56, respectively.

While the foregoing embodiment utilized only a single lens to form a pair of confocal sections in tandem, it is of course readily possible for one skilled in the art to extrapolate this configuration to one having N lenses and N+1 confocal sections in tandem.

Finally, it is possible to produce relatively high radiation density in a free space resonator which need not be confocal. Thus, as shown in FIG. 8, concave mirrors 60 and 62 form a free space resonator and a plurality of discharge tubes 64 are disposed along segments of a zig-zag path between the mirrors. The mirror spacing is adjusted so that $\cos^{-1}(L/R) = \pi/N$ where R is the radius of curvature of mirrors 60 and 62, L is the mirror spacing, and N is the number of segments in the zig-zag path. In this embodiment the curvature of a mirror serves to focus the radiation each time it impinges thereon and is redirected into the next discharge tube in the zig-zag path. Space considerations permitting, of course, it may be possible to utilize more than one tube per path segment, or no tubes in particular segments, as desired.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

What is claimed is:

1. A single frequency gas laser comprising:
   a hollow enclosure,
   a gaseous active medium disposed within said enclosure,
   means for pumping said medium to generate stimulated coherent radiation at a particular laser line, said radiation having a tendency to oscillate disadvantageously in a plurality of longitudinal modes associated with said laser line, said radiation emanating from said medium along a preferred optical path,
   at least two reflectors disposed in said path and including said enclosure therebetween for redirecting said emanated radiation to incidence on said medium,
   said laser being characterized by the improvement that the total pressure of said gaseous medium and the optical density of said radiation are mutually adapted so that the radiation-broadened homogeneous linewidth of said laser line is greater than the inhomogeneous linewidth thereof, thereby causing said laser to oscillate in a single one of said longitudinal modes.

2. The laser of claim 1 wherein said hollow enclosure comprises an elongated cylindrical tube forming an elongated optical waveguide for producing relatively high radiation density therein, said radiation emanating from the ends of said waveguide, 3. The laser of claim 2 wherein said radiation is of wavelength $\gamma$ and the inside diameter $d$ and the length $L_3$ of said tube satisfy the inequality $d < \sqrt{2L_3\gamma}$.

4. The laser of claim 3 wherein said reflectors comprise a pair of oppositely facing concave mirrors which refocus radiation emanating from the ends of said waveguide back into the ends of said waveguide.

5. The laser of claim 4 wherein said concave mirrors are separated from opposite ends of said tube so that the separation between each end of said tube and the nearer one of said mirrors is approximately equal to the radius of curvature of said nearer mirror.

6. The laser of claim 4 wherein said active medium comprises a mixture of $He^3$ and $Ne^{20}$ at a total pressure of approximately 10 Torr or greater.

7. The laser of claim 6 wherein said radiation wavelength is approximately 6328 Angstroms, said tube has an inside diameter of approximately 400 $\mu$m and has a length of approximately 20 cm.

8. The laser of claim 6 wherein said laser line is at 6328 angstroms and in combination with means for suppressing oscillation at 3.39 $\mu$m.

9. The laser of claim 8 wherein said suppressing means comprises a methane gas well disposed in said preferred path and between said mirrors.

10. The laser of claim 1 wherein said reflectors form a confocal free space resonator for producing relatively high radiation densities therein.

11. The laser of claim 1 in combination with additional hollow enclosures arranged in tandem between said reflectors, lens means disposed between adjacent ones of said enclosures thereby defining a plurality of resonator portions each including one of said enclosures, said lenses and reflectors being arranged so that each of said portions is confocal.

12. The laser of claim 11 wherein said reflectors are concave and of radii $R_1$ and $R_2$ and comprising a pair of said enclosures separated by a single lens means of focal length $f$ separated from said reflector of radius $R_1$ by a distance $L_1 = R_1$ and separated from said reflector of radius $R_2$ by a distance $L_2 = R_2$ and wherein the following relationship is approximately satisfied $$f = L_1L_2/L_1+L_2.$$

13. The laser of claim 1 wherein said reflectors are concave mirrors forming a free space resonator, said radiation is directed along a zig-zag path between said mirrors thereby defining a plurality of oblique path segments therebetween and in combination with a plurality of said enclosures, at least one of which is disposed in each of said segments, a gaseous active medium disposed in each of said enclosures and means for pumping each of said enclosures.

14. The laser of claim 13 wherein said mirrors are separated from one another by a distance L which satisfies approximately the relationship:

$$\cos^{-1}(L/R) = \pi/N$$

where R is the radius of curvature of each mirror and N is the number of said segments in said zig-zag path.

* * * * *